Jan. 15, 1952  F. W. BRADY  2,582,227

EYE EXAMINING DEVICE HAVING CONCAVE MIRROR

Filed Dec. 27, 1948

INVENTOR.
FRANK W. BRADY
BY Ford C. Pethick
ATTORNEY.

UNITED STATES PATENT OFFICE 2,582,227

EYE EXAMINING DEVICE HAVING CONCAVE MIRROR

Frank W. Brady, Scranton, Pa.

Application December 27, 1948, Serial No. 67,371

4 Claims. (Cl. 88—20)

My invention relates to a medical diagnostic instrument and treating aid, and more particularly to an instrument for self-examination of one's eye and for the self-examination of one's own facial areas adjacent the eye.

The needs for a means by which one may examine his own eye or the facial area adjacent thereto are many and universal. They may be classified in three general classes; first, it is often desirable or necessary to examine the condition of one's eyes; second, it is often necessary to medically treat one's eyes as prescribed by a physician; and third, it is often desirable to watch the progress of cures effected by such medication. It is also a very common and unpleasant experience to have a cinder or other particle of dirt lodge in one's eye, and prompt removal of the extraneous matter is not only desirable from the standpoint of comfort, but is essential to prevent conjunctivitis or other eye infections.

Heretofore, it has been very difficult for a person to examine or treat his own eye or to locate a particle of dirt that has gotten into his eye, and it has generally been necessary to enlist the help of a second person to give first aid when such action becomes necessary. A qualified person is not always at hand when one wishes to have his eye examined or when one gets "something in his eye," and also it is desirable for a person to be able to help himself in such instances. Furthermore, I have found that it is easier for a person to examine or treat his own eye or to locate a particle of dirt in his own eye with the instrument which is the subject of my present invention, than it is for another untrained person to do so.

Therefore one important object of my invention is to provide an improved diagnostic instrument or treating aid.

Another important object of my invention is to provide an improved diagnostic instrument or treating aid which permits a person to seen an enlarged image of his own eye ball, eyelids, or portions of his face adjacent the eye.

In brief, my invention provides a new and improved concave magnifying mirror designed for individual use, whereby, when the said mirror is held in front of one's eye a beam of light can shine from behind the mirror, through a transparent or translucent portion of the mirror and highly illuminate the eye in font of which the mirror is being held.

A preferred embodiment of my improved diagnostic instrument and treating aid is disclosed in the accompanying drawings in which.

Figure 1:
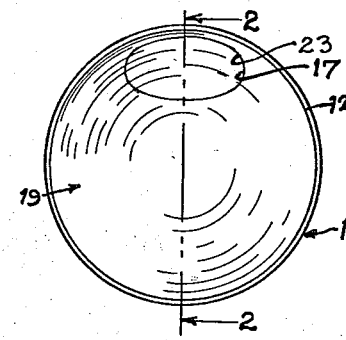
Fig. 1 is a front elevational view of a case and mirror embodying a preferred form of my invention.
Figure 2:
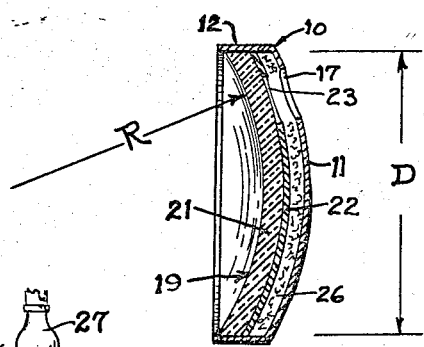
Fig. 2 is a sectional view of the case and mirror as seen along the line 2—2 of Fig. 1.

A preferred embodiment of my diagnostic instrument and treating aid is shown in Figs. 1 to 4 and comprises a box-like enclosing case 10 which may be of metal or any other suitable material having a preferably concave-convex bottom wall 11 and a preferably cylindrical side wall 12. The case is provided with a cover 13 having a preferably circular top wall 14 and a preferably cylindrical side wall 16, the cover 13 of course being designed to fit over and close the open end of the main case 10. A window 17, preferably oval in shape is provided in the bottom wall 11 and is best seen in Figs. 1 and 2. This window opening 17 is positioned in the wall 11 substantially two-thirds of the radial distance from the center of the cylindrical wall 12 to the circumference thereon, which circumference is coincident with the edge of the bottom 11. However, it will be understood that the window 17 may satisfactorily be located at other advantageous distances from the center. Also as may be seen in Fig. 1, the oval window opening 17 has its major axis substantially tangent to a circle having its center at the center of the cylindrical wall 12.

Figure 3:
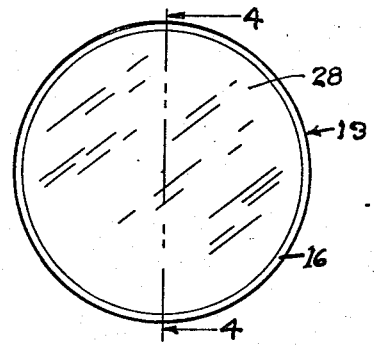
Fig. 3 is an inside elevational view of a cover for the case and mirror shown in Fig. 1.
Figure 4:
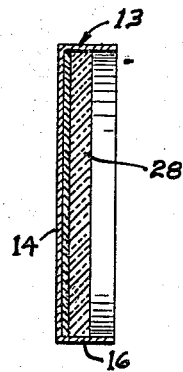
Fig. 4 is a sectional view of the cover as seen along the line 4—4 of Fig. 3.

The cylindrical wall 12 of the case 10 mounts a concave magnifying mirror 19, the outer circumference of which is of proper size to easily snap into and be held by the wall 12. The mirror 19 comprises a concave-convex glass or other transparency 21, the convex side of which is almost entirely covered with a silvered reflecting coating 22 which may be applied to the convex side of the glass 21 in any known manner. A window portion 23 of the convex surface of the glass 21 remains uncoated. Preferably the uncoated portion or window 23 is oval in form and has its major axis substantially tangent to a circle having its center coaxial with the center of the cylindrical wall 12. Also preferably this uncoated portion 23 is positioned substantially two-thirds of distance from the center of the wall 12 to the circumference thereof. From this it can be seen that when the glass 21 is properly snapped into the case 10, the uncoated portion 23 of the glass 21 advantageously coincides with the window 17 provided in the bottom 11 of the case 10. In order to prevent breakage of the concave glass 21, the space between the silvered side of the mirror 19 and the inner surface of the box 10 may be filled with a shock absorbing material such as cotton or sponge rubber as indicated by the numeral 26. In this connection it should be noted that this rubber or cotton does not obstruct the window 17 in the case 10 or the window portion 23 of the mirror 19. As a matter of convenience the cover 13 is provided with a flat mirror 28 as seen in Figs. 3 and 4.

Figure 5:
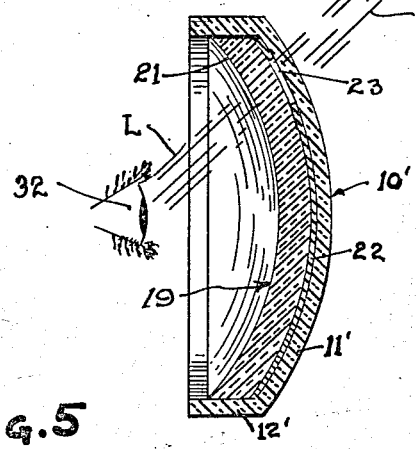
Fig. 5 is a vertical, sectional, slightly enlarged view of a second preferred form of my invention and also shows a preferred method of using my new and improved diagnostic instrument.

A second preferred embodiment of my invention is shown in Fig. 5. This embodiment differs from the embodiment illustrated in Figs. 1 to 4, principally in that a case 10', of transparent or translucent plastic, glass, or other suitable material, is substituted for the metal case previously disclosed.

The case 10' has a concave-convex bottom wall 11' and a cylindrical sidewall 12', both being made of transparent or translucent material, but otherwise similar to walls 11 and 12 previously described. The form shown in Fig. 5 also differs from the previous embodiment in that no packing is used between the plastic case 10' and the concave mirror 19. Also, since the case 10' in itself is transparent or translucent, it is not necessary to provide a window in the case; and thus the window in case 10' is dispensed with. However, it will be noted that a window 23 has been provided in that a portion of the convex side of the glass 21 remains uncoated.

In the event that it is desirable to examine one's own eye, the instrument of this invention is carried near to an electric lamp, for example lamp 27 which, for the convenience, is drawn at a reduced scale. Then the mirror 19 is held a short distance in front of the eye, as indicated in Fig. 5. Thereafter the mirror 19 and case 10 or 10' are turned and moved until beams of light L from the lamp 27 advantageously pass through the windows 17 and 23, or if Fig. 5 is considered, through the transparent case 10' and the window 23, and falls on the operator's own eye, as for example 32, thus illuminating the eye ball, the eyelids and surrounding facial areas. This illuminated eye portion is reflected by the mirror 19 which, due to its concave form, magnifies the eye ball, eyelids, etc., and thus the person is able to see a well-illuminated enlarged or magnified image of his own eye. Slight movement of the mirror 19 with respect to the eye 32 and with respect to the source of light 27 will bring the enlarged image appearing in the mirror 19 into exact focus and thus make it easy for one to examine his own eye, eyelids, etc., or to see any extraneous material which may have lodged in his eye. It will of course be appreciated that the above described diagnostic aid can be used out-of-doors or on a bright day without the use of an electric lamp.

While a concave mirror of other proportions and dimensions may be used in place of my mirror 19, I have found that a mirror of approximately the following dimensions is satisfactory:

Length of the radius "R" of the concave mirror 19: two inches (2").

Diameter "D" of the spherical cord of the mirror 19 (this dimension is substantially the same as the diameter of the case 10): two inches (2").

Size of the oval windows 17 and 23: Minor axis—one-half inch (½"); major axis—one inch (1").

Figures 6, 7:
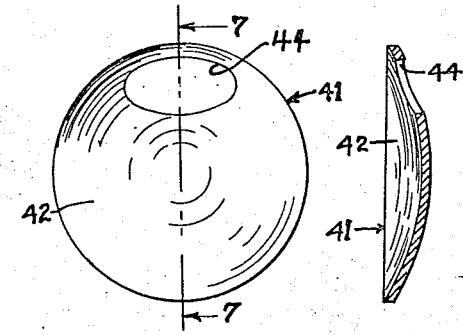
Fig. 6 is a view similar to Fig. 1, and showing a third preferred form of my invention.
Fig. 7 is a sectional view taken on the line 7—7 of Fig. 6.

Fig. 6, which illustrates a third preferred form of my invention, shows a very simple diagnostic or treating aid, comprising a concave-convex disc 41 made of stainless steel or other suitable material and having its inner concave surface 42 highly polished to provide a mirror finish. The disc 41 is provided with an oval window opening 44 which is located substantially the same and functions in substantially the same way as the window openings 17, 23, previously described.

From the above it can be seen that I have provided a novel and improved diagnostic instrument or treatment aid in the form of a concave magnifying mirror, having a means whereby light beams can pass through the mirror to illuminate an eye positioned in front of the mirror. While I have shown a mirror having an oval opening, that is, about the size of one's eye, and which is offset from the center of the mirror, it will be understood that other means may be provided for getting the light beams from behind the mirror to illuminate the eye in front thereof.

What I claim and desire to secure by Letters Patent of the United States is:

1. As an article of manufacture, a concave magnifying mirror substantially in the form of a spherical segment having a rim and a center adapted for use by an individual human eye for the examination of itself, said concave mirror being of such size as to substantially cover that portion of the human face containing the eye and extending from the eyebrow to the cheek bone, said concave mirror having a focal length of a such a figure that when said concave mirror is held substantially against the human eyebrow and cheek bone an enlarged image of the eye appearing in the concave mirror will be in focus as viewed by said eye, and said concave mirror having a central reflecting portion, and a plurality of other portions remote from said central reflecting portion and within the bounds of the rim of the substantially spherical segment, some of said other portions being reflecting portions, and one of said other portions being a light transmitting portion, said light transmitting portion of said mirror permitting light to pass from behind the mirror through the mirror, thus to illuminate the eye.

2. A concave magnifying mirror in accordance with claim 1, wherein, the light transmitting portion located between the rim of the mirror and the center thereof is oval in shape.

3. A concave magnifying mirror in accordance with claim 1, wherein, the light transmitting portion is located substantially two-thirds of the distance from the center of the mirror toward the rim thereof.

4. As an article of manufacture, a concave magnifying mirror substantially in the form of a spherical segment having a rim and a center adapted for use by an individual human eye for the examination of itself, said concave mirror being of such size as to substantially cover that portion of the human face containing the eye and extending from the eyebrow to the cheek bone, said concave mirror having a focal length of such a figure that when said concave mirror is held substantially against the human eyebrow and cheek bone an enlarged image of the eye appearing in the concave mirror will be in focus as viewed by said eye, and said concave mirror having a central reflecting portion, and a plurality of other portions remote from said central reflecting portion and within the bounds of the rim of the substantially spherical segment, some of said other portions being reflecting portions, and one of said other portions being a light transmitting portion, said light transmitting portion of said mirror permitting light to pass from behind the mirror through the mirror, thus to illuminate the eye, and a case surrounding said mirror, said case having a light transmitting portion substantially congruent with the light transmitting portion of said mirror.

FRANK W. BRADY.

REFERENCES CITED

The following references are of record in the file of this patent:

UNITED STATES PATENTS

| Number | Name | Date |
|---|---|---|
| 751,950 | Sharp | Feb. 9, 1904 |
| 1,657,334 | Adams | Jan. 24, 1928 |
| 2,026,010 | Ritz-Woller | Dec. 31, 1935 |
| 2,187,057 | Sauer | Jan. 16, 1940 |
| 2,428,649 | Brown | Oct. 7, 1947 |

FOREIGN PATENTS

| Number | Country | Date |
|---|---|---|
| 103,985 | Austria | Aug. 25, 1926 |
| 765,285 | France | Mar. 19, 1934 |